US011557291B2

(12) United States Patent
Ryu et al.

(10) Patent No.: US 11,557,291 B2
(45) Date of Patent: Jan. 17, 2023

(54) METHOD FOR LOCATION INFERENCE OF IOT DEVICE, SERVER, AND ELECTRONIC DEVICE SUPPORTING THE SAME

(71) Applicant: Samsung Electronics Co., Ltd., Gyeonggi-do (KR)

(72) Inventors: Jonghyun Ryu, Gyeonggi-do (KR); Hyunjin Kim, Gyeonggi-do (KR); Jaeyoung Lee, Gyeonggi-do (KR); Seunghwan Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 16/816,591

(22) Filed: Mar. 12, 2020

(65) Prior Publication Data
US 2020/0294503 A1    Sep. 17, 2020

(30) Foreign Application Priority Data

Mar. 15, 2019    (KR) .................. 10-2019-0029842

(51) Int. Cl.
G10L 15/22    (2006.01)
G10L 15/18    (2013.01)
G10L 15/30    (2013.01)
G16Y 30/00    (2020.01)

(52) U.S. Cl.
CPC .......... *G10L 15/22* (2013.01); *G10L 15/1815* (2013.01); *G10L 15/30* (2013.01); *G10L 2015/223* (2013.01); *G16Y 30/00* (2020.01)

(58) Field of Classification Search
USPC ..................................... 704/1–504
See application file for complete search history.

(56) References Cited

U.S. PATENT DOCUMENTS

| 9,332,172 | B1* | 5/2016 | Park ................ H04N 5/23219 |
| 10,165,054 | B2 | 12/2018 | Choi et al. |
| 10,257,865 | B2 | 4/2019 | Hong et al. |
| 10,341,981 | B2* | 7/2019 | Yu ......................... H04L 65/40 |
| 10,454,774 | B2 | 10/2019 | Smith et al. |
| 11,096,112 | B2* | 8/2021 | Choi ................... H04W 12/06 |

(Continued)

FOREIGN PATENT DOCUMENTS

| EP | 2950510 A1 | 12/2015 |
| EP | 3316123 A1 | 5/2018 |

(Continued)

OTHER PUBLICATIONS

International Search Report dated Jul. 6, 2020.
European Search Report dated Jan. 17, 2022.

*Primary Examiner* — Marcus T Riley
(74) *Attorney, Agent, or Firm* — Cha & Reiter, LLC

(57) ABSTRACT

Disclosed is a server including a communication circuit, a memory, and a processor. The processor is be configured to store identification information and location information of at least one external device in the memory, to receive identification information of an Internet of Things (IoT) device nearby the at least one external device from the at least one external device, using the communication circuit, and to store the identification information of the IoT device in association with the identification information and the location information of the at least one external device in the memory as a database.

10 Claims, 11 Drawing Sheets

(56) References Cited

U.S. PATENT DOCUMENTS

| | | | |
|---|---|---|---|
| 2010/0306154 A1* | 12/2010 | Poray | G06Q 30/02 707/E17.108 |
| 2014/0196020 A1* | 7/2014 | Shetty | G06F 8/658 717/171 |
| 2014/0244833 A1* | 8/2014 | Sharma | H04W 4/70 709/224 |
| 2015/0347114 A1* | 12/2015 | Yoon | H04W 4/60 717/176 |
| 2016/0306762 A1* | 10/2016 | Lee | H02J 50/10 |
| 2016/0323863 A1* | 11/2016 | Park | H04W 4/70 |
| 2017/0180489 A1 | 6/2017 | Hong et al. | |
| 2017/0202037 A1* | 7/2017 | Hong | H04W 12/06 |
| 2017/0206057 A1 | 7/2017 | Lee et al. | |
| 2017/0257367 A1 | 9/2017 | Han et al. | |
| 2018/0146042 A1* | 5/2018 | Choi | H04L 67/12 |
| 2018/0253202 A1* | 9/2018 | Kong | G06F 3/0488 |
| 2018/0262574 A1 | 9/2018 | Choi et al. | |
| 2018/0263071 A1* | 9/2018 | Yoon | H04W 4/50 |
| 2018/0286400 A1* | 10/2018 | Seo | G10L 15/1815 |
| 2018/0324050 A1 | 11/2018 | Smith et al. | |
| 2019/0069266 A1* | 2/2019 | Han | H04W 64/003 |
| 2019/0075167 A1* | 3/2019 | Je | G06F 3/167 |
| 2019/0220264 A1 | 7/2019 | Yoon | |
| 2020/0092173 A1 | 3/2020 | Smith et al. | |
| 2020/0243080 A1* | 7/2020 | Park | H04M 1/725 |
| 2020/0294503 A1* | 9/2020 | Ryu | H04W 4/02 |
| 2021/0195500 A1* | 6/2021 | Choi | H04W 12/06 |
| 2021/0234927 A1* | 7/2021 | Sohn | G16Y 40/30 |
| 2021/0274001 A1 | 9/2021 | Je et al. | |
| 2021/0329533 A1* | 10/2021 | Kim | H04W 4/06 |

FOREIGN PATENT DOCUMENTS

| | | |
|---|---|---|
| EP | 3373657 A1 | 9/2018 |
| EP | 3399698 A1 | 11/2018 |
| EP | 3454335 A1 | 3/2019 |
| KR | 10-1630067 B1 | 6/2016 |
| KR | 10-2017-0027627 A | 3/2017 |

* cited by examiner

METHOD FOR LOCATION INFERENCE OF IOT DEVICE, SERVER, AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2019-0029842, filed on Mar. 15, 2019, in the Korean Intellectual Property Office, the disclosure of which is incorporated by reference herein its entirety.

BACKGROUND

1. Field

The instant disclosure generally relates to a location inference technology performed by an Internet of Things (IoT) device.

2. Description of Related Art

IoT devices are being rolled out to create IoT environments, where there is an intelligent communication infrastructure in which a plurality of smart devices (e.g. homes, lights, speakers) are equipped with communication functionalities. As such, various operating platforms for IoT environments are being studied. For example, currently, a speech recognition service may be combined with the IoT environment to support the operation of an IoT device that can respond to the user's verbal commands.

Upon processing the user's verbal command (also called a user utterance input) associated with the operation of the IoT device, the location information of the IoT device needs to be included in the user utterance input such that the IoT device corresponding to the user utterance input is clearly recognized. That is, in issuing the verbal command, the user may have to manually specify the IoT device at a particular location that should process the command. In another scenario, when a new IoT device is intended to be registered in the IoT environment, the IoT device and its location needs to be clearly recognized so that when the user utterance input for operating the new IoT device is generated later, the user utterance input can be quickly processed by the appropriate IoT device. To this end, during the registration process, the location information of the new IoT device is conventionally manually entered. Accordingly, whenever the IoT device is operated or registered, it may be inconvenient to mention or enter the location information of the corresponding IoT device.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a server supporting operations of an Internet of Things (IoT) environment may include a communication circuit, a memory, and a processor electrically connected to the communication circuit and the memory. The processor may be configured to store identification information and location information of at least one external device in the memory, to receive identification information of an IoT device adjacent to the at least one external device from the at least one external device, using the communication circuit, and to store the identification information of the IoT device in association with the identification information and the location information of the at least one external device in the memory as a database.

In accordance with another aspect of the disclosure, an electronic device supporting operations of an IoT environment may include a communication circuit and a processor electrically connected with the communication circuit. The processor may be configured to perform scanning of a specified signal, using the communication circuit, to recognize at least one IoT device by detecting the specified signal transmitted from the at least one IoT device adjacent to or nearby the electronic device during the scanning of the specified signal, to transmit a request for identification information to the recognized at least one IoT device to receive the identification information, using the communication circuit, to transmit the identification information of the at least one IoT device to an external device, using the communication circuit, and further to transmit data or a signal for requesting the external device to store the identification information of the at least one IoT device in association with identification information and location information of the electronic device.

In accordance with another aspect of the disclosure, an IoT device location inferring method of a server supporting operations of an IoT environment may include storing identification information and location information of at least one external device in a memory, receiving identification information of an IoT device adjacent to or nearby the at least one external device from the at least one external device, using a communication circuit, and storing the identification information of the IoT device in association with the identification information and the location information of the at least one external device in the memory as a database.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Aspects of the disclosure are to address at least the above-mentioned problems and/or disadvantages and to provide at least the advantages described below. Accordingly, an aspect of the disclosure is to provide a location inference method of an IoT device that infers the location of the IoT device associated with the user utterance input, using the location information of an electronic device receiving the user utterance input. An electronic device and a server supporting the same are also disclosed.

Figure 1:
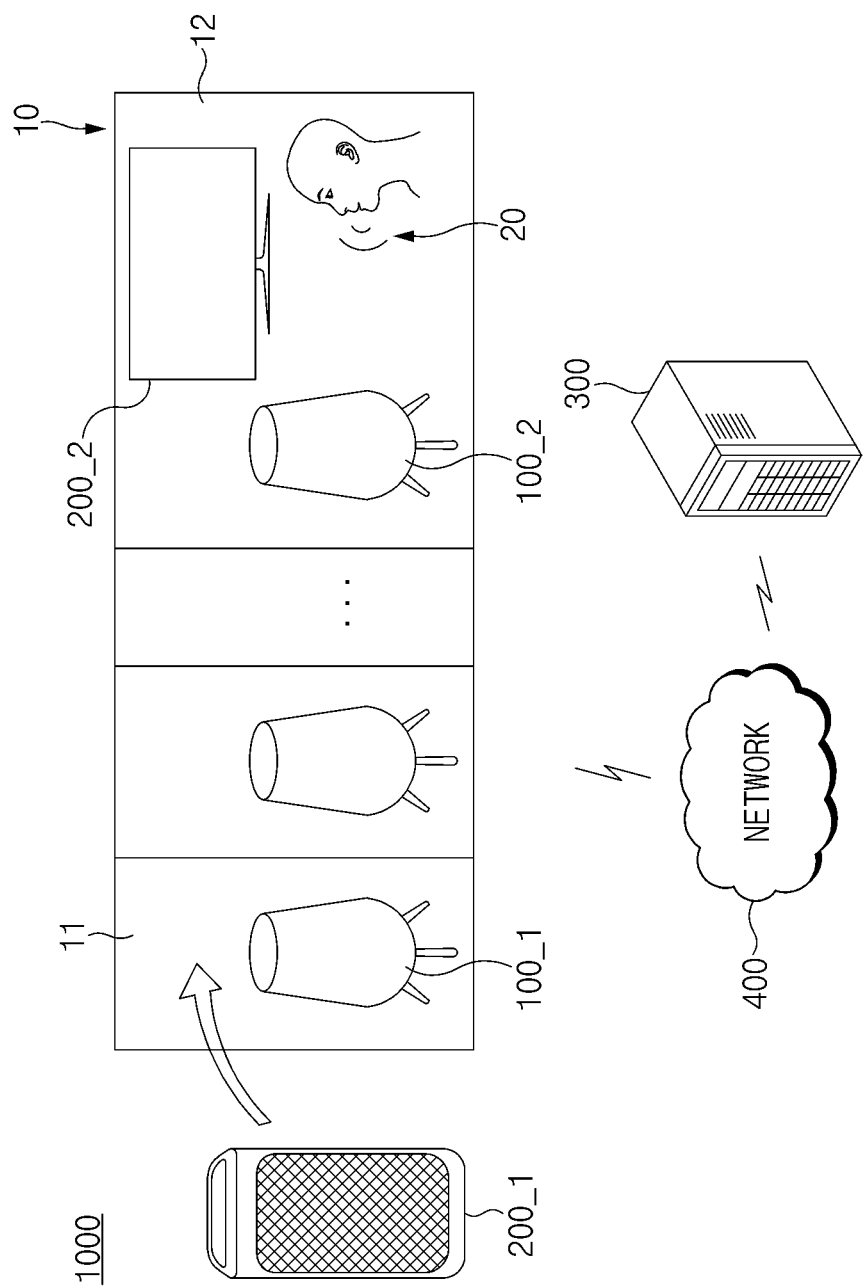
FIG. 1 is a diagram illustrating an example of an IoT environment according to one embodiment.
Figure 2:
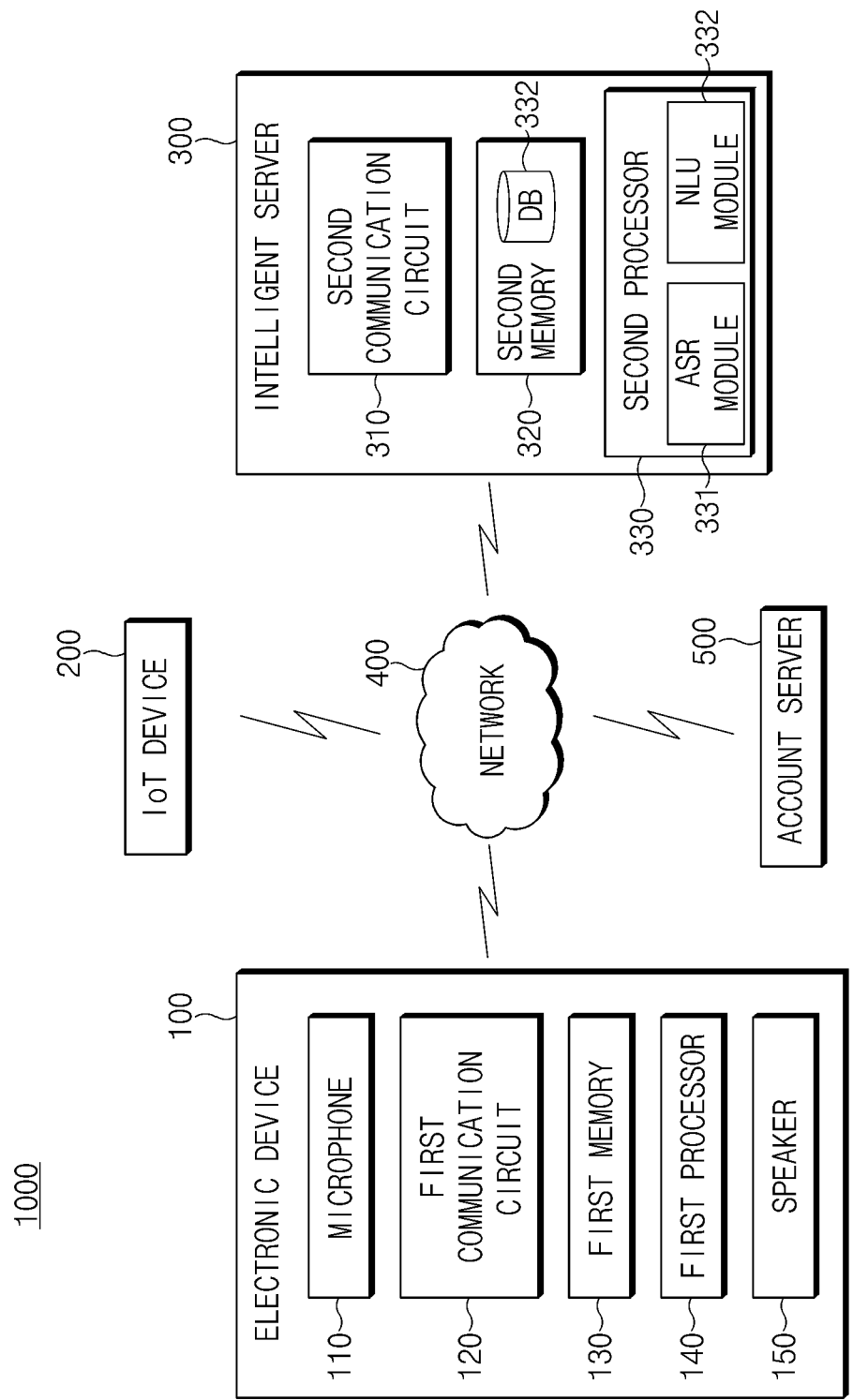
FIG. 2 is a diagram illustrating components in an IoT environment according to an embodiment.

FIG. 1 is a diagram illustrating an example of an IoT environment according to one embodiment. FIG. 2 is a diagram illustrating components of an IoT environment according to an embodiment.

Referring to FIGS. 1 and 2, the IoT environment 1000 according to an embodiment may be created at a particular location 10 (e.g., a smart home, a smart grid, a smart factory, or the like), in which at least one IoT device 200 is located. The IoT environment 1000 may support the operation of the at least one IoT device 200. For example, the IoT environment 1000 may support centralized monitoring or control based on a user utterance input for the at least one IoT device 200. In this regard, the IoT environment 1000 may include at least one electronic device 100, at least one IoT device 200, an intelligent server 300, and a network 400. In one embodiment, the IoT environment 1000 may omit at least one of the above-described components or may further include another component not shown. For example, the IoT environment 1000 may further include a mobile communication terminal (not illustrated) (e.g., a smartphone, or the like) possessed by the user. In this example, the mobile communication terminal may include a dedicated application program for accessing the IoT environment 1000. According to this embodiment, the mobile communication terminal may execute the dedicated application program under control of the user to provide monitoring information about the at least one IoT device 200 in the IoT environment 1000 or to perform information synchronization between the at least one or more IoT devices 200. Alternatively, the IoT environment 1000 may further include an account server 500 that manages user account information of various users (e.g., Samsung account information, or the like). According to an exemplary embodiment, the account server 500 may perform authentication on the user account information entered by the user on the mobile communication terminal and then may support the registration process of the at least one IoT device 200.

According to an embodiment, the at least one electronic device 100, the at least one IoT device 200, and the intelligent server 300 may interact with one another via the network 400 (e.g., LAN, WAN, Internet, telephone network, ad hoc, or the like). For example, the at least one electronic device 100 may recognize the presence of the new IoT device 200_1 (e.g., an IoT device not previously registered in the IoT environment 1000) when the new IoT device 200 is first or initially positioned within the location 10. The recognition may be performed by the at least one electronic device 100 using communication circuitry mounted therein to perform wired or wireless communication to access the network 400. Accordingly, the at least one electronic device 100 may transmit information associated with the registration of the new IoT device 200_1 to the intelligent server 300. Alternatively, the at least one electronic device 100 may receive a user utterance input associated with the operation of the at least one IoT device 200 (e.g., an IoT device previously registered in the IoT environment 1000) positioned within the location 10 and may access the network 400 by performing wired or wireless communication. Accordingly, the at least one electronic device 100 may transmit voice data of the user utterance input to the intelligent server 300. In response, the intelligent server 300 may perform the registration process of the new IoT device 200_1 using the information received from the at least one electronic device 100 or may process the user utterance input based on the voice data. In these operations, the intelligent server 300 may refer to the location information of the specific electronic device 100 which is providing the information or the voice data. For example, upon registering the new IoT device 200_1 in the IoT environment 1000, the intelligent server 300 may register the new IoT device 200_1 in association with the location information of the specific electronic device 100. Alternatively, upon processing the user utterance input, the intelligent server 300 may identify the IoT device 200 associated with the location information of the specific electronic device 100 to identify the IoT device 200 corresponding to the user utterance input. Hereinafter, examples of inferring the location of the IoT device 200 based on the location information of the at least one electronic device 100 and the functional operations of the components in the IoT environment 1000 implementing the same will be described.

In an embodiment, the at least one electronic device 100 may operate as a hub device or an artificial intelligence (AI) device that relays information between the user and the intelligent server 300 (or the at least one IoT device 200). In this regard, the at least one electronic device 100 may be positioned physically or logically within the location 10 in which the IoT environment 1000 is created. According to an embodiment, the location information about the at least one electronic device 100 in the location 10 may be entered into the above-described mobile communication terminal possessed by the user. For example, the mobile communication terminal may output a specified user interface by executing the dedicated application program capable of accessing the IoT environment 1000 under control of the user and may receive identification information and location information about the at least one electronic device 100 positioned in the location 10, from the user through the user interface. The mobile communication terminal may communicate with the intelligent server 300 to transmit the received identification information and the received location information of the at least one electronic device 100 to the intelligent server 300.

In an embodiment, the first electronic device 100_1 disposed in a first space 11 among at least one space in the location 10 may support the registration of a new IoT device 200_1 to be positioned also in the first space 11. For example, the first electronic device 100_1 may recognize the presence of the new IoT device 200_1 by performing signal scanning to detect a signal transmitted from the new IoT device 200_1 and may obtain information from the recognized new IoT device 200_1 and transmit the information to the intelligent server 300. In this example, the information obtained from the new IoT device 200_1 may be referred to as information for the registration process of the new IoT device 200_1 for the IoT environment 1000 or the intelligent server 300. Alternatively or additionally, the second electronic device 100_2 positioned in the second space 12 of the location 10 may receive a user utterance input 20 associated with the operation of the IoT device 200_2 positioned in the second space 12. The second electronic device 100_2 may transmit voice data of the user utterance input 20 to the intelligent server 300 to process the user utterance input 20. With regard to the above-described operation, the at least one electronic device 100 may include a microphone 110, a first communication circuitry 120, a first memory 130, a first processor 140, and a speaker 150. In one embodiment, the at least one electronic device 100 may omit at least one of the above-described components or may further include another component not shown. For example, the at least one electronic device 100 may further include a battery for supplying power to the above-described components and/or a display for outputting various content. Alternatively, the at least one electronic device 100 may further include one or more of the components of the electronic device 801 to be described with reference to FIG. 8.

The microphone 110 may receive voice signals corresponding to various user utterance inputs. In one embodiment, the microphone 110 may operate in an always-on state to receive the voice signals. Alternatively, the microphone 110 may operate after being activated, where such activation is caused by a user input to a hardware button of the electronic device 100. According to an embodiment, the microphone 110 may be implemented as one or more microphones, and at least part of the microphones may be exposed to the outside of the electronic device 100 in order to better detect the voice signals.

The first communication circuitry 120 may support communication between the electronic device 100 and at least one external device (e.g., the at least one IoT device 200, the intelligent server 300, and the like). For example, the first communication circuitry 120 may transmit or receive data or signals associated with the operation of the IoT environment 1000 by performing wired or wireless communication with the at least one external device according to a protocol for accessing the network 400.

The first memory 130 may store at least one command associated with the functional operation control of components of the electronic device 100. Alternatively and/or in addition, the first memory 130 may store at least one data associated with the operation of the electronic device 100. For example, the first memory 130 may store identification information (e.g., model information, version information, operating country information, OS information, or the like) of the electronic device 100 and/or may store location information where the electronic device 100 is positioned in the location 10 (e.g. information about the space in which the electronic device 100 is positioned within the location 10). Alternatively and/or in addition, the first memory 130 may store query data to be output through the speaker 150 in the registration process of the IoT device 200.

The first processor 140 may be implemented with at least one of a central processing unit, an application processor, or a communication processor and may control the components of the electronic device 100. For example, the first processor 140 may be electrically or operatively connected to the components of the electronic device 100 to deliver at least one command associated with a functional operation to the components or to perform various arithmetic operations, data processing, or the like. The first processor 140 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, when receiving a user utterance input through the microphone 110, the first processor 140 may control the first communication circuitry 120 to transmit voice data of the user utterance input to the intelligent server 300. Alternatively and/or in addition, the first processor 140 may also control the first communication circuitry 120 to perform signal scanning, in real time or periodically. The first processor 140 may recognize the presence of the new IoT device 200_1 by detecting a specific signal transmitted from the new IoT device 200_1, which is adjacent to or nearby the electronic device 100_1, based on the signal scanning. The first processor 140 may transmit a request for first identification information (e.g., model information, version information, operating country information, OS information, or the like) to the recognized new IoT device 200_1 to obtain the first identification information and may transmit the obtained first identification information to the intelligent server 300 in order to register the new IoT device 200_1. According to an embodiment, in the operation of transmitting the first identification information of the new IoT device 200_1, the first processor 140 may further transmit second identification information (e.g., model information, version information, operating country information, OS information, or the like) and location information of the electronic device 100_1 to the intelligent server 300.

In another embodiment, the second identification information and the location information of the at least one electronic device 100 may be provided to the intelligent server 300 in advance (e.g., when the at least one electronic device 100 is first positioned in the location 10). This way, transmission of the second identification information and the location information of the at least one electronic device 100 is not dependent on the transmission of the first identification information of the new IoT device 200_1. For example, when the at least one electronic device 100 is positioned in the location 10, the second identification information about the at least one electronic device 100 and the location information of the at least one electronic device 100 within the location 10 may be entered by the user into the mobile communication terminal possessed by the user, and the mobile communication terminal may transmit the received second identification information and the received location information to the intelligent server 300. Accordingly, at the time when the first processor 140 transmits the first identification information of the new IoT device 200_1, the information about the at least one electronic device 100 positioned in the location 10 (e.g., the second identification information and the location information) may already be stored in the intelligent server 300.

According to an embodiment, when transmitting the first identification information of the new IoT device 200_1, the first processor 140 may transmit data (e.g., message) or a signal to request that the intelligent server 300 create an association between the first identification information and the second identification information and the location information of the electronic device 100. This may be done so that the intelligent server 300 can recognize that a particular IoT device 200 is related to a corresponding electronic device 100. Thus, the intelligent server 300 can infer the location of the recognized IoT device 200 using the location information of the identified electronic device 100 when, at a later time, the electronic device 100 transmits voice data of a user utterance input to the intelligent server 300.

The speaker 150 may output specified voice data. For example, when the presence of the new IoT device 200_1 adjacent to or nearby the electronic device 100 is recognized through signal scanning, the speaker 150 may output query data in the form of voice output, where the voice output is generated using information stored in the first memory 130. Alternatively, the speaker 150 may output voice data provided from the intelligent server 300 to the electronic device 100. An example of such voice data is a response to the data or signal transmitted from the electronic device 100.

In an embodiment, the at least one IoT device 200 may be various IoT devices, such as a security device, an industrial device, or a sensor. In short, the at least one IoT device 200 may be any device based on IoT technology. According to an embodiment, the at least one IoT device 200 may be registered in the IoT environment 1000 or the intelligent server 300 through a series of registration processes described later and may transmit its first identification information (e.g., model information, version information, operating country information, OS information, or the like) to the electronic device 100 at the request of the electronic device 100 in the registration process. Alternatively and/or in addition, the at least one IoT device 200 may transmit various pieces of operation information (e.g., state information, function information, or the like) in batches or streamed in realtime, to the intelligent server 300, the at least one electronic device 100, or the mobile communication terminal of the user.

In an embodiment, the intelligent server 300 may collectively manage the at least one IoT device 200 registered in the IoT environment 1000 or the intelligent server 300. For example, the intelligent server 300 may perform the registration process on the new IoT device 200_1 positioned on the IoT environment 1000 (i.e. within the location 10 where the IoT environment 1000 is created), through the interaction with the at least one electronic device 100. Alternatively and/or in addition, the intelligent server 300 may receive voice data of the user utterance input associated with the operation of the registered at least one IoT device 200 from the at least one electronic device 100 and may process the user utterance input by analyzing the voice data. In this regard, the intelligent server 300 may include a second communication circuitry 310, a second memory 320, and a second processor 330.

The second communication circuitry 310 may transmit or receive data or signals between the intelligent server 300 and at least one external device (e.g., the at least one electronic device 100 and/or the at least one IoT device 200) by performing wired or wireless communication to access the network 400.

The second memory 320 may store information received from the at least one electronic device 100 or the at least one IoT device 200. For example, the second memory 320 may store various pieces of operation information (e.g., state information, function information, or the like) transmitted from the at least one IoT device 200. Alternatively and/or in addition, the second memory 320 may store the second identification information (e.g., model information, version information, operating country information, OS information, or the like) and the location information of the respective at least one electronic device 100, which are transmitted from the at least one electronic device 100 or from a mobile communication terminal possessed by the user. According to one embodiment, at the time when a particular electronic device 100 is first positioned on the IoT environment 1000 (i.e. within the location 10 where the IoT environment 1000 is created), the second identification information and the location information of that electronic device 100 may be entered into the mobile communication terminal by the user and then may be provided from the mobile communication terminal to the intelligent server 300. Alternatively, whenever a particular electronic device 100 receives a user utterance input or recognizes the presence of the adjacent new IoT device 200_1, the second identification information and the location information of that electronic device 100 may be provided from the electronic device 100 to the intelligent server 300 together with the voice data of the user utterance input and/or the first identification information obtained from the new IoT device 200_1.

The second processor 330 may be implemented with at least one of a central processing unit, an application processor, or a communication processor and may control the components of the intelligent server 300. For example, the second processor 330 may be electrically or operatively connected to the components of the intelligent server 300 to deliver at least one command associated with a functional operation to the components or to perform various arithmetic operations, data processing, or the like. The second processor 330 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101

In an embodiment, the second processor 330 may build a database 322, using information stored in the second memory 320. For example, when the second processor 330 receives the first identification information of the new IoT device 200_1 adjacent to or nearby a particular electronic device 100_1 (or present in the same space in the location 10) from the electronic device 100_1, the second processor 330 may store the first identification information of the new IoT device 200_1 in association with the second identification information and the location information of the electronic device 100_1 previously stored in the second memory 320 in the database 322. In this regard, as the electronic device 100_1 has obtained the first identification information by recognizing the presence of the new IoT device 200_1 based on signal scanning, the second processor 330 may infer that the electronic device 100_1 and the new IoT device 200_1 are present in the same space. Based on this inference, the second processor 330 may determine that the location of the new IoT device 200_1 is adjacent to or nearby the mobile communication terminal of the user and may store an association between the location of the new IoT device 200_1 and the previously stored location information of the electronic device 100_1 in the second memory 320. This association is made such that the location information of the electronic device 100_1 can be used as the location information of the new IoT device 200_1. That is, when the second processor 330 receives the first identification information of the new IoT device 200_1 adjacent to or nearby the electronic device 100_1 from the electronic device 100_1, the second processor 330 may store the second identification information and the location information of the electronic device 100_1 provided together with the first identification information in the database 322 in association with the first identification information.

According to one embodiment, in the operation of storing the first identification information of the new IoT device 200_1 in association with the second identification information and the location information of the electronic device 100_1, the second processor 330 may modify and store at least part of the first identification information. For example, the second processor 330 may combine model information of the new IoT device 200_1 included in the first identification information and the location information of the electronic device 100_1 and then may store the combined result. In a more particular example, when the model information of the new IoT device 200_1 indicates an air purifier and the location information of the electronic device 100_1 indicates a living room that is a part of the location 10, when the location 10 is a smart home, the second processor 330 may change the model information of the new IoT device 200_1 into "air purifier at a living room" and may store the changed information in the database 322.

According to an embodiment, the second processor 330 may analyze and process voice data of a user utterance input received from the electronic device 100, particularly the electronic device 100_1. For example, the user utterance input may include a command to operate the IoT device 200_1 adjacent to or AA the electronic device 100_1 (or present in the same space in the location 10). With regard to analyzing and processing the voice data of the user utterance input, the second processor 330 may include an Automatic Speech Recognition (ASR) module 331 and a Natural Language Understanding (NLU) module 332. According to different embodiments, the ASR module 331 and the NLU module 332 may be independent of one another or may be integrated at least partly.

The ASR module 331 may recognize voice data received from the electronic device 100_1 and may convert the voice data into text data. For example, the ASR module 331 may this conversion using an acoustic model including information about utterance or phonation or a language model including at least one unit phoneme information and the combination of unit phonemes.

The NLU module 332 may receive the text data from the ASR module 331 and may derive the intent of the user utterance input associated with the voice data, based on the text data. For example, the NLU module 332 may divide the text data into grammatical units (e.g. words, phrases or morphemes), may analyze grammatical elements or linguistic features of each unit to determine the meaning of the text data, and thus may derive the intent of the user utterance input associated with the voice data.

According to an embodiment, the second processor 330 may identify the IoT device 200 corresponding to the intent of the user utterance input derived by the NLU module 332, by referencing the database 322 built in the second memory 320. For example, the second processor 330 may identify the specific electronic device 100 transmitting the voice data using the database 322, based on the second identification information received together with the voice data of the user utterance input and may determine that the IoT device 200 stored in association with the identified specific electronic device 100 is the IoT device 200 corresponding to the intent of the derived user utterance input. Furthermore, as the identified specific electronic device 100 is associated with the IoT device 200 corresponding to the intent of the user utterance input, the second processor 330 may infer that the specific electronic device 100 and the IoT device 200 are adjacent to each other or present in the same space to determine that the location of the IoT device 200 is the same as or similar to the location of the specific electronic device 100. In other words, the second processor 330 may infer that the location information of the IoT device 200 may correspond to the location information of the specific electronic device 100. In an embodiment, the second processor 330 may generate an operation sequence or a control signal and transmit the operation sequence or the control signal to the IoT device 200 such that the IoT device 200, of which the location is inferred, performs the operation corresponding to the intent of the derived user utterance input.

As described above, the second processor 330 may associate the information (e.g., the second identification information and the location information) of the electronic device 100_1 positioned in the location 10 with the information (e.g., the first identification information) of the new IoT device 200_1 adjacent to or nearby the electronic device 100_1. These information and the association may be stored in the database 322. Moreover, when the user utterance input associated with the operation of the new IoT device 200_1 occurs later, the second processor 330 may determine the location of the new IoT device 200_1 by referring to the location information of the electronic device 100_1 stored in association with the new IoT device 200_1 in the database 322. Accordingly, even though there is no parameter indicating the identification information or the location information of the IoT device 200_1 in the user utterance input, the second processor 330 may identify the IoT device 200_1 associated with the electronic device 100_1 providing the voice data of the user utterance input to determine the IoT device 200_1 and may transmit an operation sequence or a control signal corresponding to the intent of the user utterance input. The operations above can also be applied to IoT device 200_2 and electronic device 100_2 shown in FIG. 1. For example, when the user utterance input 20 is recorded by the electronic device 100_2, by performing the above described operations, the intelligent server 300 may infer that the IoT device 200_2 is the intended target for the user utterance input 20.

Figure 3A:
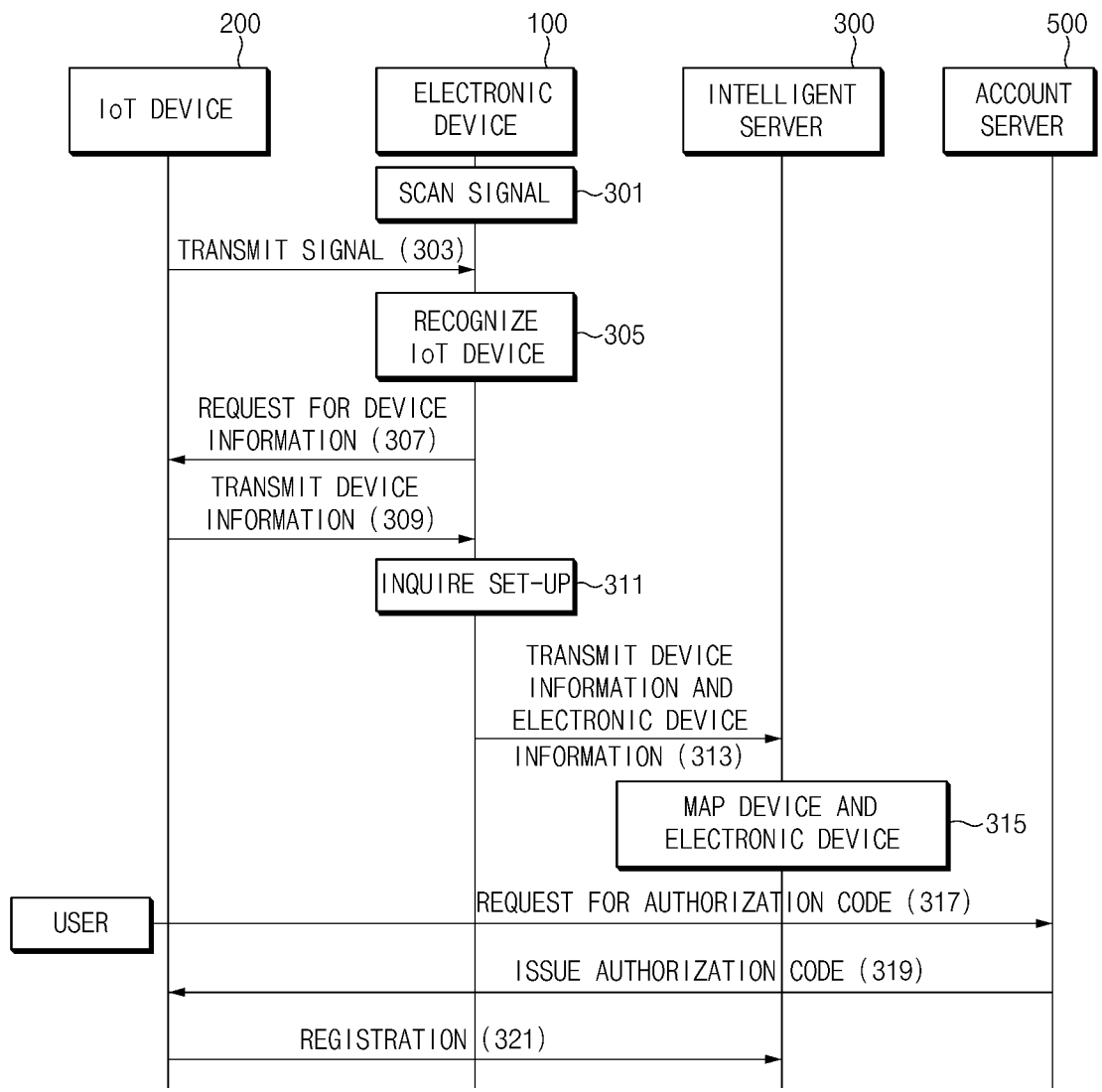
FIG. 3A is a diagram illustrating a registration process of an IoT device according to an embodiment.
Figure 3B:
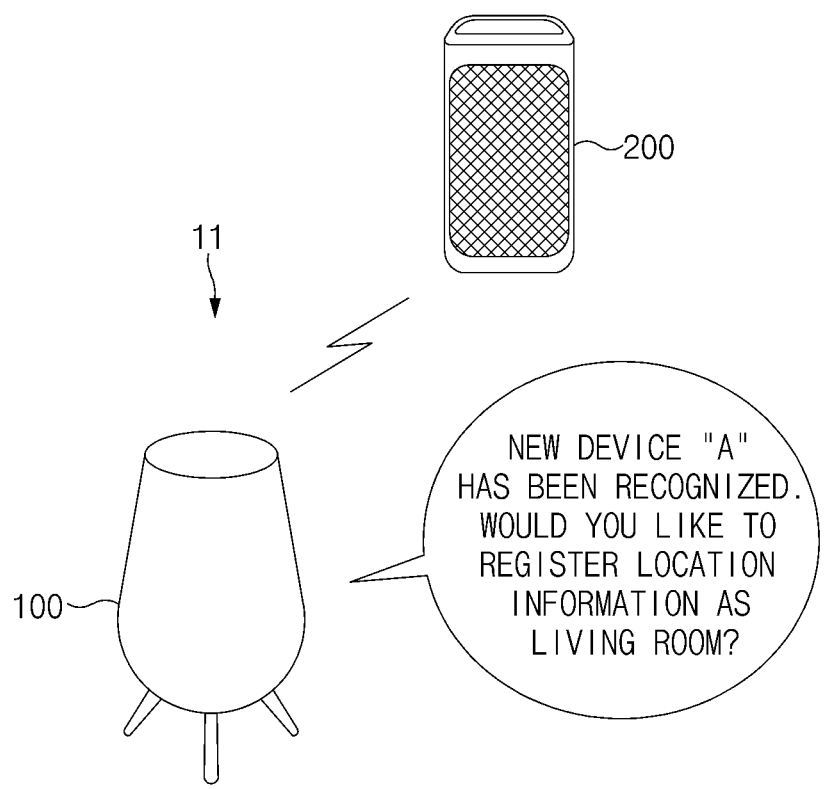
FIG. 3B is a diagram illustrating a registration example of an IoT device according to an embodiment.

FIG. 3A is a diagram illustrating a registration process of an IoT device according to an embodiment. FIG. 3B is a diagram illustrating a registration example of an IoT device according to an embodiment.

Referring to FIGS. 3A and 3B, in operation 301, the electronic device 100 positioned in the partial space 11 in a location 10 of FIG. 1 (e.g., a smart home, a smart grid, a smart factory, or the like) where the IoT environment 1000 of FIG. 1 or 2 is created may perform signal scanning. For example, the first processor 140 of FIG. 2 of the electronic device 100_1 may perform signal scanning using the first communication circuitry 120 of FIG. 2 of the electronic device 100_1. The signal scanning may be done based on a schedule, in real time, or periodically.

In operation 303, when a power supply voltage is applied to it, the IoT device 200_1 (e.g., an IoT device that is not previously registered in the IoT environment 1000) positioned to be adjacent to or nearby the electronic device 100_1 (or positioned in the space 11 where the electronic device 100_1 is positioned) may transmit a specified signal (e.g., Bluetooth Low Energy (BLE), ZigBee, or the like) in real time or periodically. According to an embodiment, it may be understood that the signal transmission of the IoT device 200_1 is an operation of transmitting a signal to the electronic device 100_1 such that the electronic device 100_1 recognizes the presence of the IoT device 200_1.

In operation 305 and operation 307, the first processor 140 of the electronic device 100_1 may recognize the IoT device 200_1 that is adjacent or in the same space 11 and may transmit a request for information associated with the IoT device 200_1 from the recognized IoT device 200_1. For example, the first processor 140 may recognize the presence of the IoT device 200_1 by receiving a signal transmitted from the IoT device 200_1 when performing signal scanning using the first communication circuitry 120 and may transmit a request for the first identification information (e.g., model information, version information, operating country information, OS information, or the like) of the IoT device 200_1 to collect information of the recognized IoT device 200_1.

In operation 309 and operation 311, the first processor 140 of the electronic device 100_1 may receive the first identification information from the IoT device 200 and may inquire a user to register (or set-up) the IoT device 200_1. For example, the first processor 140 may output query data in the form of voice output using the speaker 150 of FIG. 2 mounted in the electronic device 100. In this operation, the first processor 140 may include in the query data at least part of the first identification information and the second identification information and the location information of the electronic device 100_1. For example, the first processor 140 may include in the query data at least part (e.g., model information A) of the first identification information of the IoT device 200_1 received from the IoT device 200_1 and the location information (e.g., living room) of the electronic device 100_1 stored in the first memory 130, and then may output the query data as voice output (e.g., "New device 'A' has been recognized. Would you like to register location information as the living room?"). In another example, when the location information of the electronic device 100_1 is not present in the first memory 130, the first processor 140 may request for the pre-stored location information of the electronic device 100_1 (e.g., stored in and provided from the mobile communication terminal of the user) to the intelligent server 300 to obtain the location information of the electronic device 100_1. The first processor 140 may then include in the query data at least part of the obtained location information of the electronic device 100_1 and the first identification information of the IoT device 200_1 (e.g., model information A) and output the query data.

When a response utterance input to approve the registration of the IoT device 200_1 is received from the user after the output of the query data, in operation 313, the first processor 140 of the electronic device 100 may transmit the first identification information of the IoT device 200_1 received from the IoT device 200_1 and the second identification information (e.g., model information, version information, operating country information, OS information, or the like) and location information of the electronic device 100_1 to the intelligent server 300 that collectively manages the at least one IoT device 200 in the IoT environment 1000. According to one embodiment, the first processor 140 may exclude the transmission of at least one of the second identification information and the location information of the electronic device 100_1. This may occur when the second identification information and/or the location information of the electronic device 100_1 are previously entered into the mobile communication terminal of the user when the electronic device 100_1 was first positioned in the IoT environment 1000 (or in the partial space 11 of the location 10 where the IoT environment 1000 is created). The second identification information and/or the location information of the electronic device 100_1 may then be transmitted to the intelligent server 300 from the mobile communication terminal, and thus the intelligent server 300 may already have the second identification information and/or the location information of the electronic device 100_1 stored in the second memory 320 of FIG. 2 when the IoT device 200_1 is being registered.

In operation 315, the second processor 330 of FIG. 2 of the intelligent server 300 may store the second identification information and the location information of the electronic device 100_1 in association with the first identification information of the IoT device 200_1 (e.g., storing the two as a mapping or in table form). For example, the second processor 330 may store the second identification information and location information of the electronic device 100_1, which are provided together with the first identification information of the IoT device 200_1 or are already stored in the second memory 320, in association with the first identification information of the IoT device 200_1 in the database 322 of FIG. 2. According to one embodiment, the second processor 330 may simply store the second identification information and location information of the electronic device 100_1 in association with only the first identification information of the IoT device 200_1 and may refer to the associated location information of the electronic device 100_1 when determining the location of the IoT device 200_1. Alternatively, the second processor 330 may generate separate location information of the IoT device 200_1 based on the location information of the electronic device 100_1 and may store the first identification information and the location information of the IoT device 200_1 in association with the second identification information and the location information of the electronic device 100_1.

According to one embodiment, the registration process of the IoT device 200_1 may include an authentication process for an account in which the IoT device 200_1 is registered. In this regard, in operation 317, the mobile communication terminal owned by the user may request for a specified authorization code to the account server 500 that collectively manages user account information associated with the operation of the IoT environment 1000. For example, the mobile communication terminal may output a specified user interface (e.g., the execution screen of the dedicated application program for accessing the IoT environment 1000) in response to user control and may transmit user account information (e.g., Samsung account information, or the like), which is entered by the user to the user interface, to the account server 500 to request for the specified authorization code.

In operation 319, the account server 500 may issue an authorization code based on the authentication for user account information provided from the mobile communication terminal. For example, the account server 500 may determine the validity of the user account information by referencing the issue history of the user account information, whether the user account information is authentic, the validity period of the user account information, or the like. When it is determined (or authenticated) that the user account information is valid, the account server 500 may generate the authorization code. The account server 500 may transmit the generated authorization code to the mobile communication terminal and may request that the authorization code be delivered to the IoT device 200_1, which is the IoT device being registered.

In operation 321, the IoT device 200_1 may receive the authorization code from the mobile communication terminal or the account server 500, may transmit the authorization code to the intelligent server 300, and complete the registration for the IoT environment 1000 (or registration in the intelligent server 300). According to an embodiment, when the registration of the IoT device 200_1 is approved by the intelligent server 300, the communication between the intelligent server 300 and the IoT device 200_1 may be established.

Figure 4A:
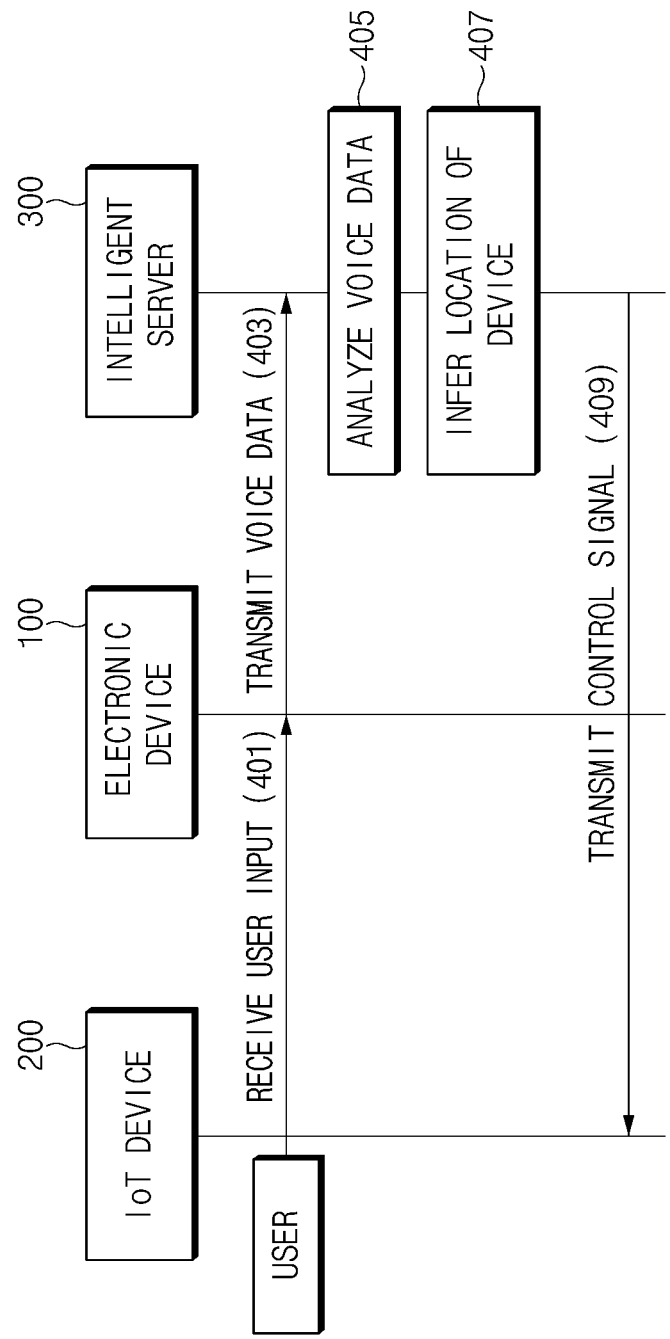
FIG. 4A is a diagram illustrating processing of a user utterance according to an embodiment.
Figure 4B:
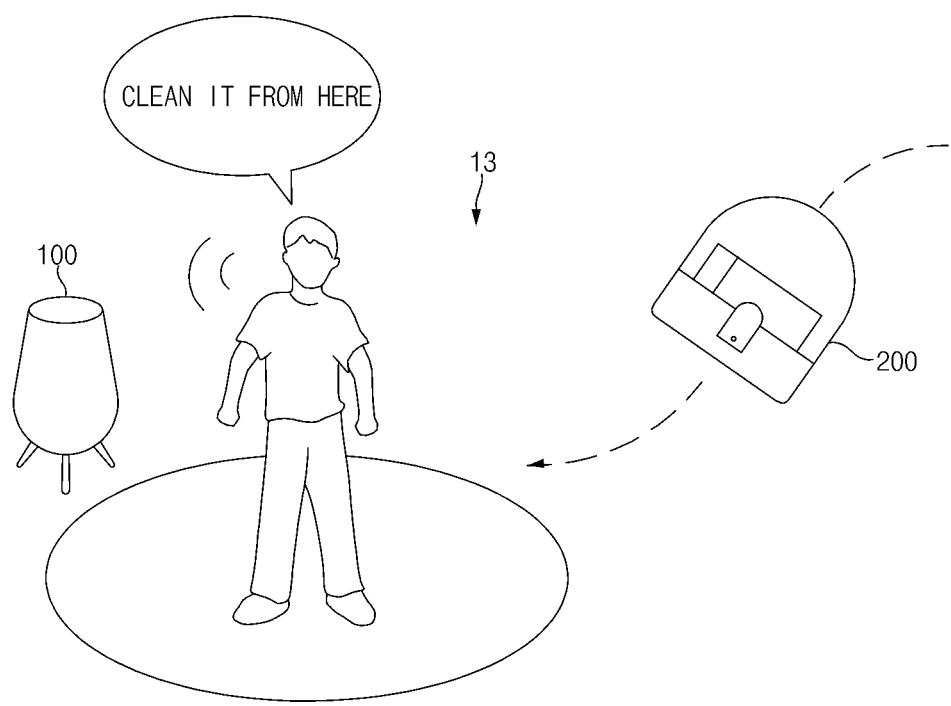
FIG. 4B is a diagram illustrating an example of processing of a user utterance according to an embodiment.
Figure 4C:
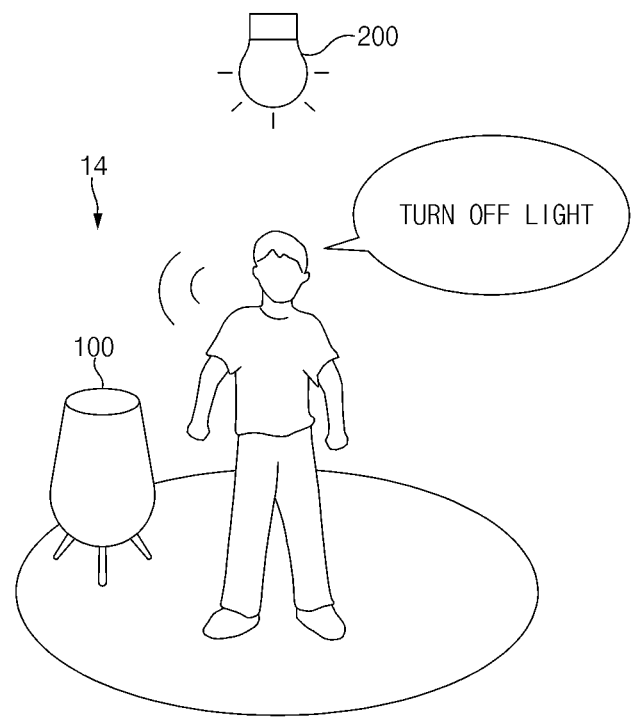
FIG. 4C is a diagram illustrating an example of processing of another user utterance according to another embodiment.

FIG. 4A is a diagram illustrating processing of a user utterance according to an embodiment. FIGS. 4B and 4C are diagrams illustrating examples of processing various user utterances according to certain embodiments.

Referring to FIGS. 4A, 4B, and 4C, in operation 401, the electronic device 100 positioned in the location 10 of FIG. 1 (e.g., a smart home, a smart grid, a smart factory, or the like), where the IoT environment 1000 of FIG. 1 or 2 is created, may receive a user utterance input (e.g., "clean it from here" or "turn off the light" as shown in FIGS. 4B-4C) for operating the at least one IoT device 200 registered in the IoT environment 1000 (or the intelligent server 300). For example, the first processor of the electronic device 100 (140 of FIG. 2) may receive a user utterance input for operating at least one IoT device 200, which is adjacent to or nearby the electronic device 100 or is present in the same space (e.g. the space 11) as the electronic device 100, via the mounted microphone (110 of FIG. 2). According to an embodiment, the user utterance input received through the microphone 110 may not include parameters identifying or locating the desired IoT device 200. Alternatively, the user utterance input may include a parameter indicating the location of the desired IoT device 200 (e.g. "turn off the living room light.").

In operation 403, the first processor 140 of the electronic device 100 may transmit voice data of the user utterance input to the intelligent server 300, which collectively manages the at least one IoT device 200 in the IoT environment 1000, using the first communication circuitry 120 in FIG. 2. According to an embodiment, for the purpose of supporting recognition with high reliability by the intelligent server 300 for the voice data, the first processor 140 may pre-process the voice data prior to transmission (e.g., echo cancellation, background noise suppression, volume control, equalization, endpoint detection, or the like).

In operation 405, the second processor (330 of FIG. 2) of the intelligent server 300 may analyze the voice data received from the electronic device 100. For example, the second processor 330 may convert the voice data into text data, using an acoustic model or a language model. The second processor 330 may then derive the intent of the user utterance input associated with the voice data by determining the meaning of the text data, as described above.

In operation 407, the second processor 330 of the intelligent server 300 may identify the IoT device 200 corresponding to the intent of the derived user utterance input and may determine the location of the IoT device 200. In this operation, the second processor 330 may refer to the database 322 of FIG. 2 in the second memory 320 of FIG. 2 which is built by the registration process of the at least one IoT device 200 for the IoT environment 1000 (or in the intelligent server 300). According to an embodiment, the database 322 may be built by associating the second identification information (e.g., model information, version information, operating country information, OS information, or the like) and location information of the electronic device 100 supporting the registration of the corresponding IoT device 200 with the first identification information (e.g., model information, version information, operating country information, OS information, or the like) of the at least one IoT device 200 to be registered in the IoT environment 1000. According to another embodiment, the database 322 may be constructed by correlating second identification information and location information of the electronic device 100 with first identification information and location information (e.g., separate location information of IoT device 200 generated based on the location information of the electronic device 100) of the IoT device 200.

According to an embodiment, the second processor 330 may determine that the electronic device 100 transmitting the voice data and the user are present in, for example, space 11, and may identify the electronic device 100 transmitting the voice data in the database 322. Also, the second processor 330 may determine that the user utterance input is an input associated with the operation of the IoT device 200, which is also present in for example the space 11 adjacent to the user or the electronic device 100, and may identify that the IoT device 200 stored in association with the electronic device 100 identified in the database 322 is the IoT device 200 corresponding to the intent of the user utterance input. As described above, the database 322 stored in the second memory 320 of the intelligent server 300 includes the location information of the electronic device 100, which is stored in association with the identified IoT device 200. Alternatively, the database 322 includes the location information of the IoT device 200 that is the same as or corresponding to the location information of the electronic device 100. This way, the second processor 330 may identify and/or locate the IoT device 200 with reference to the database 322.

According to an embodiment, the electronic device 100 transmitting the voice data of the user utterance input and the IoT device 200 corresponding to the intent of the user utterance input may not be associated with each other. For example, when the IoT device 200 corresponding to the intent of the user utterance input is a mobile IoT device 200 as shown in FIG. 4B, the electronic device 100 supporting the registration of the mobile IoT device 200 may be different from the electronic device 100 transmitting the voice data, and thus the electronic device 100 transmitting the voice data and the IoT device 200 corresponding to the intent of the user utterance input may not be associated with each other. In this regard, when the second processor 330 receives the voice data of the user utterance input from a particular electronic device 100, the second processor 330 may identify an attribute (e.g., function) of the IoT device 200 stored in association with the particular electronic device 100 by referencing to the database 322. When the attribute of the IoT device 200 associated with the particular electronic device 100 does not correspond to the intent of the derived user utterance input, the second processor 330 may identify the attribute of the at least one IoT device 200 associated with another electronic device 100 in the database 322. In an embodiment, when the attribute of the IoT device 200 stored in association with the other electronic device 100 corresponds to the intent of the user utterance input, the second processor 330 may generate voice-type feedback data including the location information of the other electronic device 100 (e.g., "The intended device is currently in the kitchen. Does your intent mean this device?"). For example, as shown in FIG. 4B, the second processor 330 may determine that the user utterance input includes the word "clean." The second processor 330 may then determine an attribute of the IoT device 200 corresponding to the word "clean." A robot vacuum may have an attribute corresponding to "clean," but a smart lightbulb may not have an attribute corresponding to "clean." The second processor 330 may then identify the IoT device 200 based on the attribute. The second processor 330 may then transmit the feedback data to the particular electronic device 100 that transmitted the voice data of the user utterance input. The second processor 330 may identify the IoT device 200 corresponding to the intent of the user utterance input based on the user response utterance provided from the particular electronic device 100 that transmitted the voice data of the user utterance input and may determine the location of the identified IoT device 200 based on the location information of the electronic device 100 stored in association with the identified IoT device 200 or the location information of the identified IoT device 200 itself.

In operation 409, the second processor 330 may generate an operation sequence or a control signal and transmit the operation sequence or the control signal to the corresponding IoT device 200 such that the IoT device 200, of which the location is determined, performs an operation corresponding to the intent of the user utterance input.

According to an embodiment, above-described operation 405 to operation 409 may be performed by one of the at least one electronic device 100 instead of the intelligent server. In this regard, the at least one electronic device 100 may include a plurality of electronic devices 100 positioned in each of the spaces in the location 10. One of the plurality of electronic devices 100 may function as the main electronic device 100 collectively managing the other at least one electronic device 100. In an embodiment, the main electronic device 100 may perform at least some of the functional operations of the intelligent server 300 described above. For example, the main electronic device 100 may analyze voice data of the user utterance input transmitted from at least another electronic device 100 by using the ASR module 331 of FIG. 2 and the NLU module 332 of FIG. 2, and thus the main electronic device 100 may derive the intent of the user utterance input. Furthermore, the main electronic device 100 may identify the particular electronic device 100 transmitting the voice data of the user utterance input and the IoT device 200 corresponding to the intent of the user utterance input by using a database built in the same or similar way as the database 322 of the intelligent server 300. Moreover, the main electronic device 100 may determine the location of the IoT device 200 corresponding to the intent of the user utterance input based on the location information of the electronic device 100 stored in association with the corresponding IoT device 200 in the database. Alternatively, the main electronic device 100 may determine the location of the IoT device 200 based on the location information of the IoT device 200 itself (e.g., generated location information based on the location information of the electronic device 100 stored in association with the corresponding IoT device 200).

Figure 5:
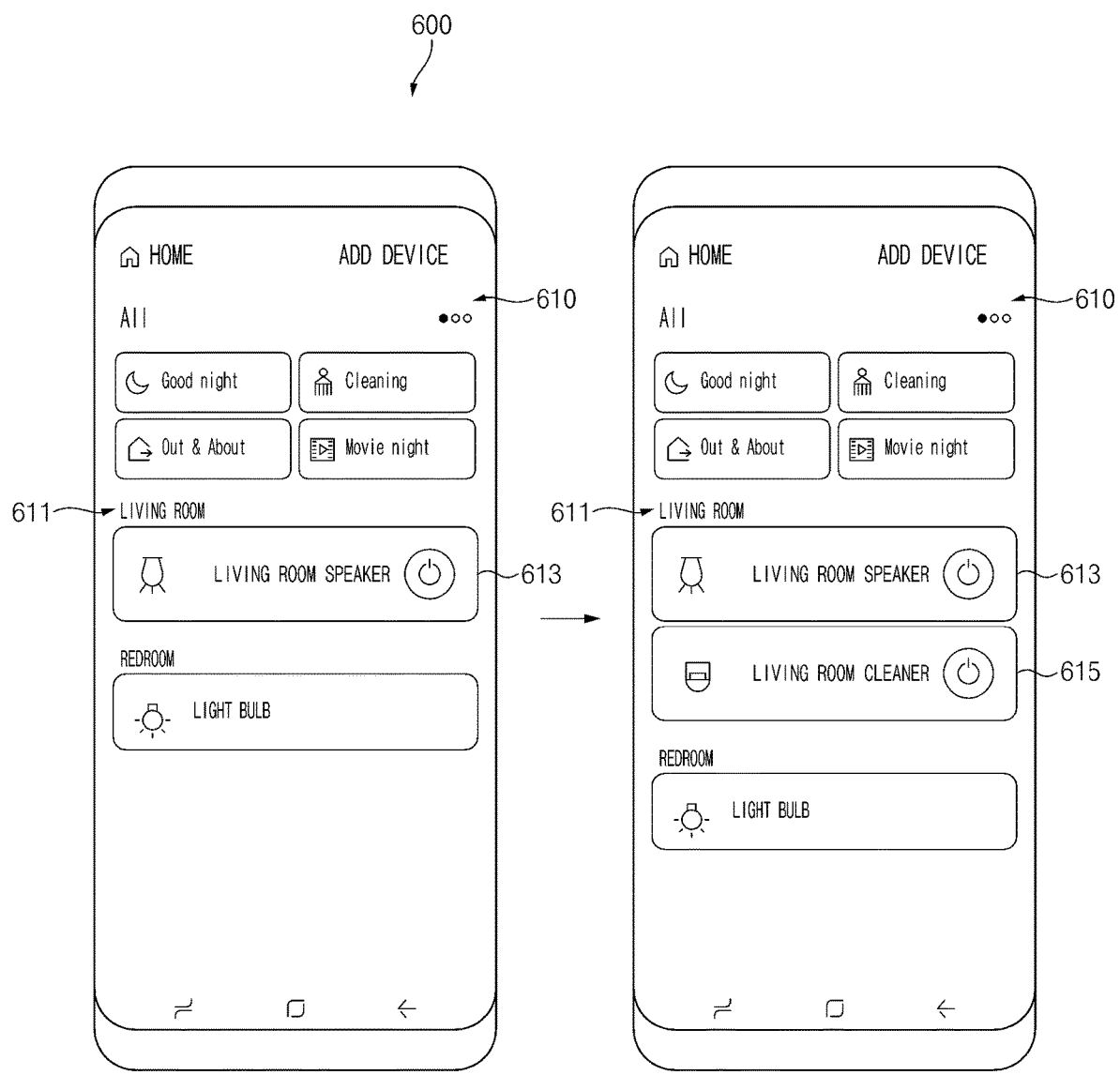
FIG. 5 is a diagram illustrating a user interface, according to an embodiment.

FIG. 5 is a diagram illustrating a user interface, according to an embodiment.

Referring to FIG. 5, according to an embodiment, a mobile communication terminal 600 possessed by a user may execute a dedicated application program for accessing the IoT environment 1000 of FIG. 1 or 2 in response to user control and may output a user interface 610 of the dedicated application program. According to an embodiment, the user interface 610 may include a home screen of the dedicated application program and various other screens navigable from the home screen.

In an embodiment, the mobile communication terminal 600 may output the user interface 610 that includes user interface (UI) elements for the at least one electronic device 100 and the at least one IoT device 200 in a list. These UI elements may be based on information about at least one electronic device 100 in FIG. 2, which is entered from a user. These UI elements may be based on information about the at least one IoT device 200, which is provided from the intelligent server 300 in FIG. 2.

According to an embodiment, the at least one electronic device 100 and the at least one IoT device 200 may be grouped and displayed on the user interface 610 based on location. For example, location information 611 associated with the at least one electronic device 100 or the at least one IoT device 200 may be displayed as an upper portion on the user interface 610; identification information 613 of the at least one electronic device 100 and/or the at least one IoT device 200 associated with the location information 611 may be displayed as a lower portion to correspond to the upper portion. In a more specific example, in the case of the electronic device 100 positioned in 'LIVING ROOM', which is a part of the location 10 of FIG. 1, the location information corresponding to the 'LIVING ROOM' may be displayed as an upper portion; and 'SPEAKER,' which is the identification information of the electronic device 100, may be displayed as a lower portion. In an embodiment, the location information displayed as the upper portion may be the location information of the electronic device 100 stored in the database 322 of FIG. 2 of the intelligent server 300 or the location information of the IoT device 200 itself or may be the location information of the electronic device 100 stored in association with the IoT device 200. According to an embodiment, the identification information of the at least one electronic device 100 and/or the at least one IoT device 200, which is displayed as the lower portion, may be displayed in combination with the location information of the upper portion (e.g., LIVING ROOM SPEAKER).

According to an embodiment, the user interface 610 may be updated depending on the registration of the new IoT device 200_1 for the IoT environment 1000 or in the intelligent server 300. For example, when the new IoT device 200_1 is positioned in a partial space within the location 10, as the electronic device 100 positioned in the partial space recognizes the new IoT device 200_1, the electronic device 100 and the new IoT device 200_1 may be associated and each other and then the associated information may be stored in the database 322 of the intelligent server 300. Subsequently, the mobile communication terminal may update the user interface 610 by receiving information about the new IoT device 200_1 registered in the IoT environment 1000 from the intelligent server 300. For example, when the new IoT device 200_1 is positioned in 'LIVING ROOM' in the location 10 and registered in the IoT environment 1000, 'CLEANER,' which is the identification information 615 of the new IoT device 200_1, may be displayed on the user interface 610 in the lower portion and the label "LIVING ROOM" is displayed in the corresponding upper portion. As described above, the identification information of the new IoT device 200_1 may be displayed (e.g., LIVING ROOM CLEANER) in combination with the location information shown in the upper portion.

Figure 6:
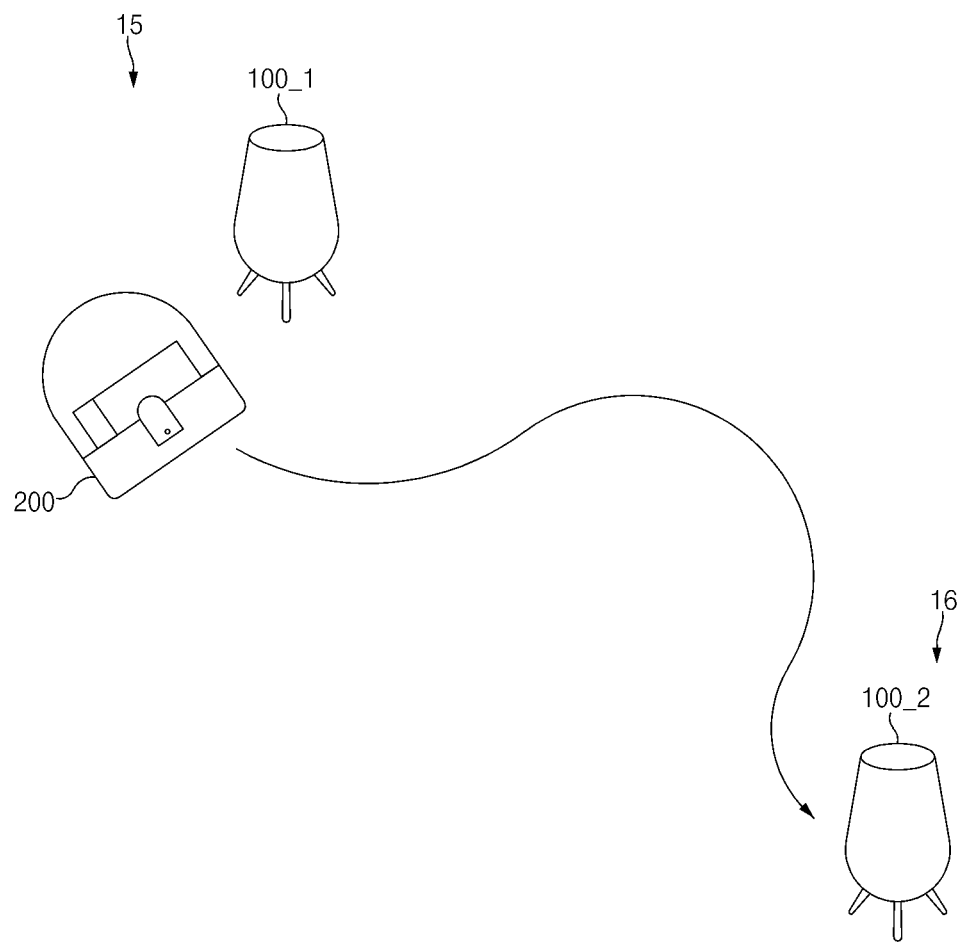
FIG. 6 is a diagram illustrating an example of updating location information of an IoT device according to an embodiment.

FIG. 6 is a diagram illustrating an example of updating location information of an IoT device according to an embodiment.

Referring to FIG. 6, the IoT device 200 according to an embodiment may be a mobile IoT device 200 capable of moving through the various spaces of the location 10 of FIG. 1 where the IoT environment 1000 of FIG. 1 or 2 is created. In this case, the information associated with the mobile IoT device 200 may be updated in real time or periodically, in the database 322 of FIG. 2 included in the intelligent server 300 of FIG. 1 or 2. For example, the mobile IoT device 200 may be associated with the first electronic device 100_1 within a space 15 where the registration for the first IoT environment 1000 (or in the intelligent server 300) is supported, and then the associated result may be stored on the database 322. Then, the mobile IoT device 200 may be associated with the second electronic device 100_2 in another space 16 adjacent to the IoT device 200 after it has moved and then the associated result may be stored. In this regard, the mobile IoT device 200 may transmit a specified signal (e.g., BLE or ZigBee) when movement is initiated, and the second electronic device 100_2 that detects the specified signal through signal scanning may obtain first identification information of the mobile IoT device 200 and transmit the first identification information to the intelligent server 300. In an embodiment, the second processor 330 of FIG. 2 of the intelligent server 300 may identify the information storage state (or an association status with a corresponding electronic device 100) of the mobile IoT device 200 corresponding to the first identification information transmitted by the second electronic device 100_2, by referencing to the database 322. When the mobile IoT device 200 is not associated with the second electronic device 100_2, the second processor 330 may store the second identification information and location information of the second electronic device 100_2 in association with the first identification information of the mobile IoT device 200. In an embodiment, in the operation in which the second processor 330 associates the mobile IoT device 200 with the second electronic device 100_2 and then stores the associated result, the second processor 330 may generate the location information of the mobile IoT device 200 to be the same as or corresponding to the location information of the second electronic device 100_2 and may further associate and store the generated location information of the mobile IoT device 200.

Figure 7:
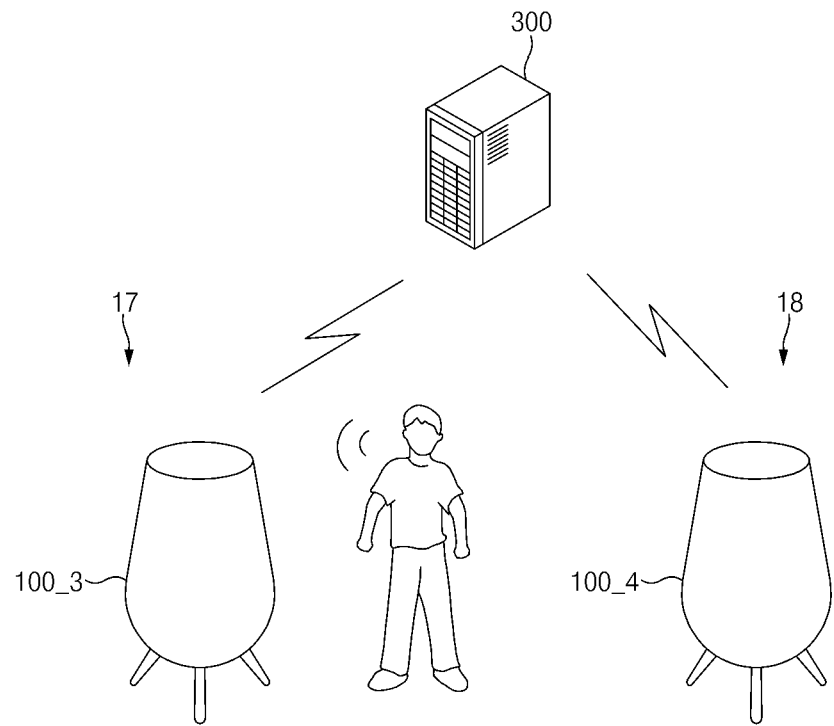
FIG. 7 is a diagram illustrating an example of a process where a user utterance is received by a plurality of electronic devices according to an embodiment.

FIG. 7 is a diagram illustrating an example of a process where a user utterance is received by a plurality of electronic devices according to an embodiment.

Referring to FIG. 7, the intelligent server 300 may receive voice data of a user utterance input from a plurality of electronic devices 100_3 and 100_4. In this regard, the user utterance input, which is uttered from user adjacent to or nearby the third electronic device 100_3 within a space 17, may also be received by the fourth electronic device 100_4 within another space 18 adjacent to or nearby the third electronic device 100_3. In this case, each of the third electronic device 100_3 and the fourth electronic device 100_4 may transmit voice data of the received user utterance input to the intelligent server 300. According to an embodiment, when receiving pieces of identical or similar voice data within a specified time range, the second processor 330 of FIG. 2 of the intelligent server 300 may identify the signal strength or time stamp information of each of the pieces of voice data. The second processor 330 may analyze the voice data having relatively high signal strength and whose time stamp information is relatively earlier. The other voice data may be discarded.

According to the above-described an embodiment, a server supporting operations of an Internet of Things (IoT) environment may include a communication circuit, a memory, and a processor electrically connected to the communication circuit and the memory.

According to an embodiment, the processor may store identification information and location information of at least one external device in the memory, may receive identification information of an IoT device adjacent to the at least one external device from the at least one external device, using the communication circuit, and may store the identification information of the IoT device in association with the identification information and the location information of the at least one external device in the memory as a database.

According to an embodiment, the identification information and the location information of the at least one external device may be transmitted from the at least one external device a time when the at least one external device is initially positioned in the IoT environment, or the identification information and the location information of the at least one external device may be transmitted from the at least one external device when the identification information of the IoT device is transmitted from the at least one external device.

According to an embodiment, the processor may include an Automatic Speech Recognition (ASR) module and a Natural Language Understanding (NLU) module, which are associated with recognition of voice data. The processor may receive voice data of a user utterance input associated with an operation of the IoT device from the at least one external device, using the communication circuit and may recognize the voice data, using the ASR module and the NLU module.

According to an embodiment, the processor may derive a command or intent included in the user utterance input from the recognized voice data and may determine that the IoT device is associated with the derived command or intent, based on the identification information of the IoT device associated with the at least one external device providing the voice data stored in the database.

According to an embodiment, the processor may determine a location of the IoT device that is associated with the derived command or intent, based on the location information of the at least one external device providing the voice data included in the database.

According to an embodiment, the processor may transmit a control signal associated with the derived command or intent to the IoT device, whose location is determined, using the communication circuit.

According to an embodiment, the at least one external device may include a plurality of external devices. The processor may identify an attribute of the IoT device associated with the at least one external device providing the voice data stored in the database and may identify an attribute of at least one other IoT device associated with at least one other external device stored in the database when the attribute of the IoT device fails to correspond to the derived command or intent.

According to an embodiment, the processor may generate voice-type feedback data including location information of the at least one other external device when the attribute of the at least one other IoT device corresponds to the derived command or intent and may transmit the feedback data to the at least one external device providing the voice data, using the communication circuit.

According to an embodiment, the at least one external device may include a plurality of external devices. The processor may recognize voice data having a highest signal strength and whose time stamp information is earliest when receiving pieces of identical or similar voice data from the plurality of external devices within a specified time range.

According to the above-described an embodiment, an electronic device supporting operations of an IoT environment may include a communication circuit and a processor electrically connected with the communication circuit.

According to an embodiment, the processor may perform scanning of a specified signal, using the communication circuit, may recognize at least one IoT device by detecting the specified signal transmitted from the at least one IoT device adjacent to the electronic device during the scanning of the signal, may transmit a request for identification information to the recognized at least one IoT device to receive the identification information, using the communication circuit, may transmit the identification information of the at least one IoT device to an external device, using the communication circuit, and may further transmit data or a signal for requesting the external device to store the identification information of the at least one IoT device in association with identification information and location information of the electronic device.

According to an embodiment, the identification information and the location information of the electronic device may be transmitted to the external device when the electronic device is initially positioned in the IoT environment.

According to an embodiment, the identification information and the location information of the electronic device may be transmitted to the external device together with the identification information of the at least one IoT device.

According to an embodiment, the electronic device may further include at least one microphone. The processor may receive a user utterance input associated with an operation of the at least one IoT device, using the at least one microphone and may transmit voice data of the user utterance input to the external device, using the communication circuit.

According to an embodiment, the electronic device may further include a memory and at least one speaker. The processor may store voice-type query data associated with registration of the at least one IoT device for the IoT environment in the memory and may output the query data, using the at least one speaker when the at least one IoT device is recognized.

According to an embodiment, the processor may include the location information of the electronic device and the identification information of the at least one IoT device in the query data.

According to an embodiment, the specified signal may be at least one of a Bluetooth Low Energy (BLE) signal and a ZigBee signal.

According to the above-described an embodiment, an IoT device location inferring method of a server supporting operations of an IoT environment may include storing identification information and location information of at least one external device in a memory, receiving identification information of an IoT device adjacent to the at least one external device from the at least one external device, using a communication circuit, and storing the identification information of the IoT device in association with the identification information and the location information of the at least one external device in the memory as a database.

According to an embodiment, the IoT device location inferring method may further include receiving voice data of a user utterance input associated with an operation of the IoT device from the at least one external device, using the communication circuit and recognizing the voice data.

According to an embodiment, the recognizing of the voice data may include deriving a command or intent included in the user utterance input and determining that the IoT device is associated with the derived command or intent, based on the identification information of the IoT device associated with the at least one external device providing the voice data stored in the database.

According to an embodiment, the recognizing of the voice data may include deriving a command or intent included in the user utterance input and determining a location of the IoT device that is associated with the derived command or intent, based on the location information of the at least one external device providing the voice data included in the database.

Figure 8:
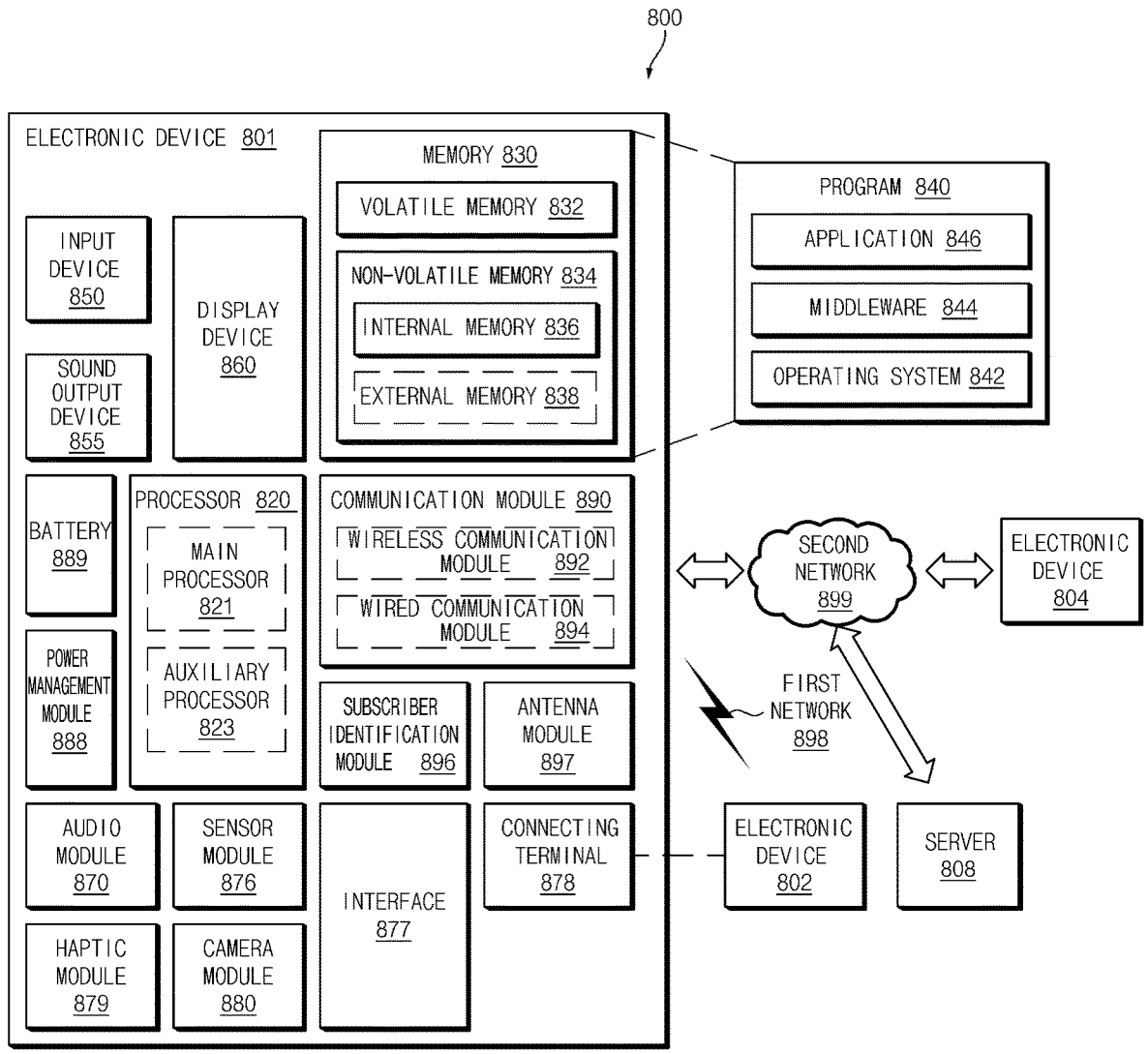
FIG. 8 is a diagram illustrating an electronic device in a network environment, according to an embodiment.

FIG. 8 is a block diagram illustrating an electronic device 801 in a network environment 800 according to an embodiment. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment, it is possible to achieve user convenience when the user is not required to specify the location information of a desired IoT device when the IoT device is registered.

According to an embodiment, even though the IoT device is not specified by the user, through registrations of the IoT device, the IoT device may be clearly recognized.

In addition, a variety of other effects and advantages directly or indirectly understood through the disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to an embodiment thereof, it will be understood by those skilled in the art that various changes in form and details may be made therein without departing from the spirit and scope of the disclosure as defined by the appended claims and their equivalents.

What is claimed is:

1. A server comprising:
   a communication circuit;
   a memory; and
   a processor electrically connected to the communication circuit and the memory,
   wherein the processor is configured to:
      store identification information and location information of at least one external device in the memory;
      receive identification information of an IoT (Internet of Things) device nearby the at least one external device from the at least one external device, using the communication circuit;
      store the identification information of the IoT device in association with the identification information and the location information of the at least one external device in the memory;
      receive, using the communication circuit, pieces of identical or similar voice data from a plurality of external devices within a specified time range, the voice data corresponding to a user utterance input associated with an operation of the IoT device; and
      recognize voice data having a highest signal strength or whose time stamp information is earliest,
   wherein the location information of the at least one external device is mapped to the identification information of the IoT device as location information of the IoT device, and
   wherein the plurality of external devices comprises the at least one external device.

2. The server of claim 1, wherein:
   the identification information and the location information of the at least one external device are transmitted from the at least one external device at a time when the at least one external device is connected with the server; or
   the identification information and the location information of the at least one external device are transmitted from the at least one external device when the identification information of the IoT device is transmitted from the at least one external device.

3. The server of claim 1, wherein the processor includes an Automatic Speech Recognition (ASR) module and a Natural Language Understanding (NLU) module, which are associated with recognition of voice data, and
   wherein the processor is configured to:
   recognize the voice data, using the ASR module and the NLU module.

4. The server of claim 3, wherein the processor is configured to:
   identify a command associated with the user utterance input from the recognized voice data; and
   determine that the IoT device is associated with the identified command, based on the identification information of the IoT device associated with the at least one external device.

5. The server of claim 4, wherein the processor is configured to:
   determine a location of the IoT device that is associated with the identified command, based on the location information of the at least one external device.

6. The server of claim 5, wherein the processor is configured to:
   transmit a control signal associated with the identified command to the IoT device, whose location is determined, using the communication circuit.

7. The server of claim 4,
   wherein the processor is configured to:
   identify an attribute of the IoT device associated with the at least one external device; and
   when the attribute of the IoT device fails to correspond to the identified command, identify an attribute of at least one other IoT device associated with at least one other external device.

8. The server of claim 7, wherein the processor is configured to:
   when the attribute of the at least one other IoT device corresponds to the identified command, generate voice-type feedback data including location information of the at least one other external device; and
   transmit the voice-type feedback data to the at least one external device, using the communication circuit.

9. An IoT device location inferring method of a server, the method comprising:
   storing identification information and location information of at least one external device in a memory;
   receiving identification information of an IoT (Internet of Things) device associated with the at least one external device from the at least one external device, using a communication circuit;
   storing the identification information of the IoT device in association with the identification information and the location information of the at least one external device in the memory;
   receiving pieces of identical or similar voice data from a plurality of external devices within a specified time range, the voice data corresponding to a user utterance input associated with an operation of the IoT device, using the communication circuit; and
   recognizing voice data having a highest signal strength or whose time stamp information is earliest,
   wherein the location information of the at least one external device is mapped to the identification information of the IoT device as location information of the IoT device.

10. The method of claim 9, further comprising:
    identifying a command associated with the voice data; and
    determining that the IoT device is associated with the identified command, based on the location information of the IoT device and an external device associated with the recognized voice data.

* * * * *